G. C. THOMAS.
MACHINE FOR MAKING CONCRETE, COMPOSITION, OR LIKE BRICKS, BLOCKS, SLABS, AND THE LIKE.
APPLICATION FILED AUG. 25, 1920.

1,368,073.

Patented Feb. 8, 1921.
2 SHEETS—SHEET 1.

Inventor
G. C. Thomas

G. C. THOMAS.
MACHINE FOR MAKING CONCRETE, COMPOSITION, OR LIKE BRICKS, BLOCKS, SLABS, AND THE LIKE
APPLICATION FILED AUG. 25, 1920.
1,368,073.
Patented Feb. 8, 1921.
2 SHEETS—SHEET 2.
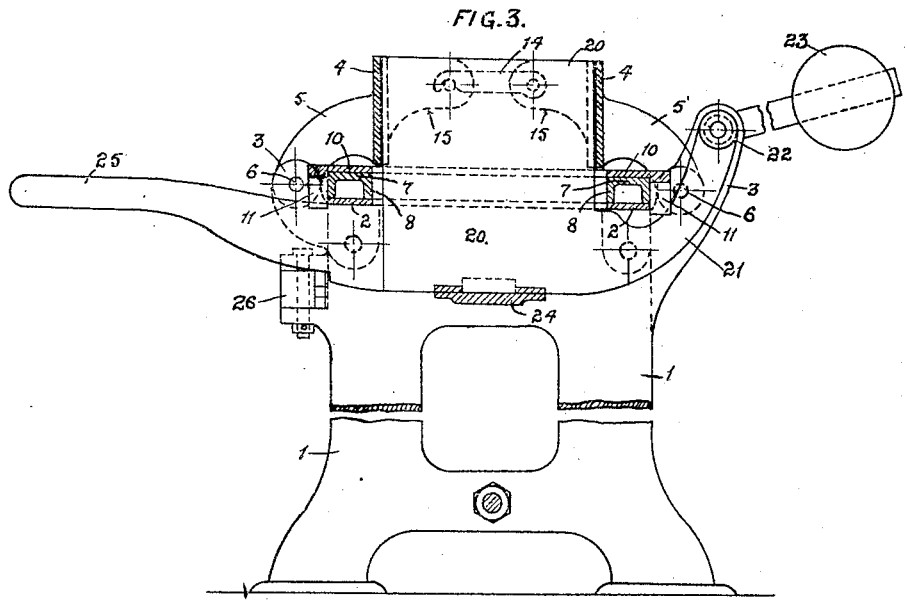
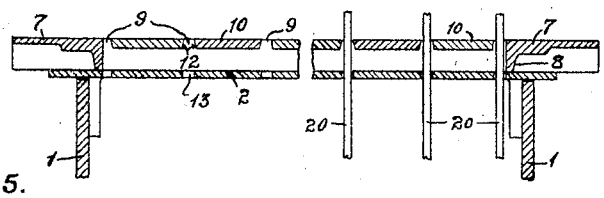
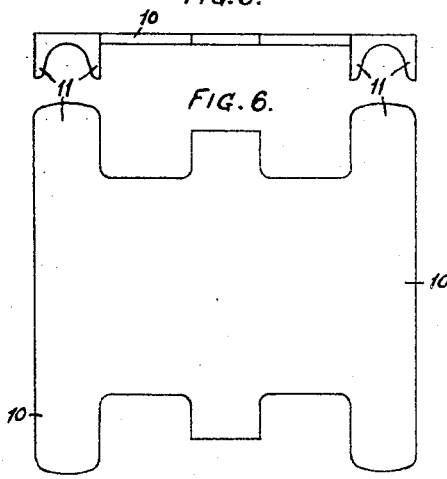
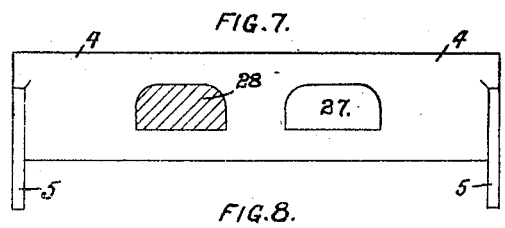
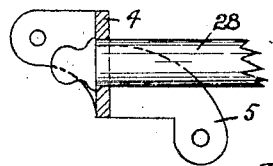
Inventor
G. C. Thomas

UNITED STATES PATENT OFFICE.

GEORGE CHARLES THOMAS, OF ANGLESEY, WALES.

MACHINE FOR MAKING CONCRETE, COMPOSITION, OR LIKE BRICKS, BLOCKS, SLABS, AND THE LIKE.

1,368,073.  Specification of Letters Patent.  Patented Feb. 8, 1921.

Application filed August 25, 1920. Serial No. 405,990.

*To all whom it may concern:*

Be it known that I, GEORGE CHARLES THOMAS, a subject of the King of England, and residing at Anglesey, Wales, have invented Improvements in or Connected with Machines for Making Concrete, Composition, or like Bricks, Blocks, Slabs, and the like, of which the following is a specification.

This invention has reference to machines for making cement and other concrete, composition, or like bricks, blocks or slabs.

The primary object of the present invention is to provide a simple form of machine of this character by which a relatively large number of bricks or blocks can be made in a machine of a given size within a given time, and of a size capable of being easily worked by hand; and at the same time to provide a machine of this character which is simple and inexpensive to make; and a further object is to provide a machine of this character which can also be used whenever desired for making single blocks or slabs.

A concrete or like material block or brick making machine, according to this invention, comprises a plurality of vertical hinged mold plates, adapted to be moved up and down on the hinge through the table of the machine, into and out of the molding position; and further, in this machine the main pallet plate carries a plurality of other pallet plates with gaps or slots between them, through which the vertical mold plates pass.

Figure 1:
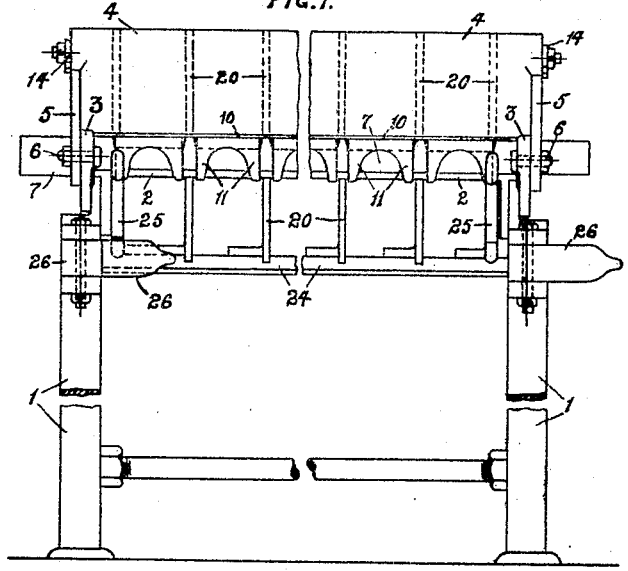
Figure 2:
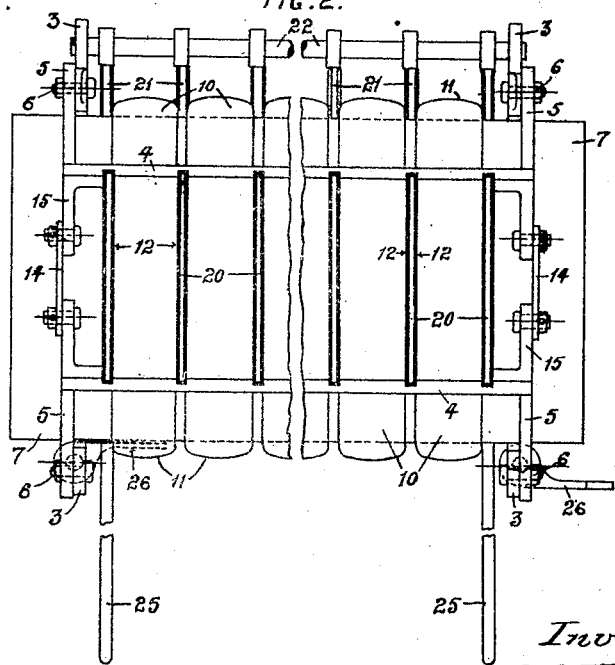

In the drawing, Figure 1 is a front elevation, Fig. 2 is a plan, Fig. 3 is a cross section, and Fig. 4 a longitudinal section of the machine; while Figs. 5 to 8 are details showing modifications showing the machine when it is to be used for making single blocks or slabs.

In the machine two side frames 1 carry a stationary table 2, and to the brackets 3 on same, the front and back mold plates 4 are hinged by hinges 6 and arms 5.

On the top of the table 2 the main pallet plate 7 rests, which has flanges 8 all around, which rests on the table 2 (see Figs. 3 and 4); and the upper portion projects out at each end as seen in Fig. 4, so that it can be readily handled by the operators. Within the flanges 8, the plate 7 is open; and the longitudinal members of it are channel shaped (see Fig. 3), and are gapped out leaving projecting division ribs 9; and in the recesses thus formed, the transverse secondary pallet plates 10 rest; and they are held on the table by the pendant horn-shaped over-hanging end portions 11, (see Fig. 1), so that they can be grasped by the hand between the horns.

Gaps or slots 12 exist between the pallet plates 10 for the division plates 20.

When the mold front and back wall plates 4 are in the molding position, their lower edge rests on the upper surface of the plate 7; while when the mold plates 4 are moved down, the back one will rest on the brackets or arms 3; while the front one may rest on stops on the arms or brackets 3.

The plates 4 are locked together by hinged links 14, on arms 15 on one plate, and fitting over a pin in the arms 15 on the other plate.

When the mold is opened, the plates 10, with the bricks or blocks on them are taken away by removing the plate 7; or by removing the individual plates 10; after which other pallet plates 10 can be put on.

The several division plates 20 are carried by arms 21, mounted upon a shaft 22, fixed in the brackets 3, and having a weighted counter balance lever 23 for balancing the parts. The plates 20 are secured together by a longitudinal channel plate 24 formed with gaps in which the lower edges of the plates 20 rest, and they are actuated up and down by two hand levers 25 on the two end plates 20.

By this arrangement of division plates 20, and the position of their carrying pivots, they describe an arc, and afford great leverage, and in consequence call for less manual force and labor in working the machine. The division plates 20 never completely come out of the slots in the bed 2, which thus constitutes guides to same.

The plates 4 are recessed, and the division and end plates 20 pass into these recesses.

When the plates 20 are moved up by the handles 25, they are locked by the hinged devices 26 on the frames 1 (see left hand side of Fig. 1); while to lower the levers 25, the devices 26 are moved, as shown on the right hand side of Fig. 1.

To mold a single block, all the plates 20, except the two end plates are disconnected from their shaft 22, and hang down out of the way; and instead of plate 7 (Figs. 1 to 4) and plates 10 being used, a single plate 10 is used (see Figs. 5 and 6); and the end plates 20 on the handle 25 will, when moved up, come up on each end edge of the plate 10, and form the ends of the mold.

For making single blocks, the plates 4 have no grooves, except at the ends for the edges of the end plates 30.

To make hollow blocks, the plates 4 are provided with apertures as 27 (see Fig. 7); and cores 28 are inserted in them. The bottom of the mold is first filled with material, then the cores 28 are inserted, and the mold is filled up, and afterward the cores 28 are withdrawn, and the plates 4 swung back, and the plates 20 lowered, whereupon the pallet plate 10 with its block is carried away.

The different plates and parts are made of any suitable material.

A machine of the kind described, requires very little power or labor, and little care to make bricks, slabs or blocks; and in addition to, and in consequence of this, a very large number can be turned out in a given time and at cheap cost; and by the arrangement and mode of operation and use of the division plates, shaking or disturbing of the bricks or blocks after they are made is prevented.

Claims:

1. A machine for making concrete or like bricks or blocks including a mold box and a series of vertical plates movable through the bottom of the box, means for hingedly supporting said plates beyond the box, and means for connecting the plates for simultaneous movement relative to said hinge.

2. A machine for making concrete or like bricks or blocks wherein a plurality of vertical mold plates are hinged and adapted to be moved up and down about said hinge through slots or openings in the table or machine and into and out of the molding position, the hinge of the mold plates being above the level of the table.

3. A molding machine comprising a molding box having a bed, a series of mold plates vertically movable through the bed, and a series of independent pallet plates to be supported on the bed, said mold plates moving to an inoperative limit position to a plane below the pallets but above the bed.

4. A molding machine comprising a bed, walls coöperating therewith to form a mold box, a pallet supported on the bed, pallet plates arranged on the bed within an opening formed in the pallet, and a series of mold plates vertically movable through the bed and between the pallet plates, said pallet plates being supported in spaced parallel relation to the bed.

5. A molding machine comprising a bed, walls coöperating therewith to form a mold box, a pallet supported on the bed, pallet plates arranged on the bed within an opening formed in the pallet, and a series of mold plates vertically movable through the bed and between the pallet plates, said pallet plates being supported in spaced parallel relation to the bed, the side walls of the box being channeled to receive the edges of the mold plates.

In testimony whereof I have signed my name to this specification in the presence of two subscribing witnesses.

GEORGE CHARLES THOMAS.

Witnesses:
CLIFFORD FAIRBAIRN ROYSTON,
SHELAGE DONALDSON.